(12) United States Patent
Aoyagi et al.

(10) Patent No.: US 8,908,317 B1
(45) Date of Patent: Dec. 9, 2014

(54) METHOD FOR DETECTING TOUCHDOWN OF HEAD AND DISK STORAGE APPARATUS

(71) Applicant: Kabushiki Kaisha Toshiba, Tokyo (JP)

(72) Inventors: Yuka Aoyagi, Yokohama (JP); Shuichi Kojima, Kodaira (JP); Toru Watanabe, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/206,923

(22) Filed: Mar. 12, 2014

Related U.S. Application Data

(60) Provisional application No. 61/932,089, filed on Jan. 27, 2014.

(51) Int. Cl.
*G11B 21/02* (2006.01)

(52) U.S. Cl.
USPC .............................................. 360/75; 360/31

(58) Field of Classification Search
CPC ...... G11B 5/3133; G11B 5/607; G11B 5/455; G11B 5/4555; G11B 5/02
USPC ......................... 360/75, 55, 31, 53, 59, 234.3; 369/13.33, 13.13
See application file for complete search history.

(56) References Cited

U.S. PATENT DOCUMENTS

| | | | |
|---|---|---|---|
| 8,416,521 B2 | 4/2013 | Kondo | |
| 8,523,312 B2 | 9/2013 | Zheng et al. | |
| 8,531,797 B2 * | 9/2013 | Zhao et al. | 360/75 |
| 8,654,618 B1 * | 2/2014 | Liu et al. | 369/13.33 |
| 8,717,702 B2 * | 5/2014 | Zeng et al. | 360/75 |
| 8,767,339 B2 * | 7/2014 | Zeng et al. | 360/75 |
| 8,786,977 B2 * | 7/2014 | Setiadi et al. | 360/75 |
| 2008/0239581 A1 | 10/2008 | Ikai et al. | |
| 2012/0002319 A1 | 1/2012 | Kondo | |
| 2013/0094107 A1 | 4/2013 | Setiadi et al. | |
| 2014/0029402 A1 | 1/2014 | Zheng et al. | |

FOREIGN PATENT DOCUMENTS

| | | |
|---|---|---|
| JP | 2008-097760 | 4/2008 |
| JP | 2012-014788 | 1/2012 |
| JP | 4910063 | 4/2012 |
| JP | 2012-104213 | 5/2012 |

* cited by examiner

*Primary Examiner* — Ali Neyzari
(74) *Attorney, Agent, or Firm* — Knobbe Martens Olson & Bear LLP

(57) ABSTRACT

According to one embodiment, there is provided a method for detecting touchdown of head in a disk storage apparatus. The disk storage apparatus includes the head. The head includes a write element, a read element, a head disk interference (HDI) sensor, and a heater element. The HDI sensor detects thermal interference between the head and the disk. The method supplies alternating-current heater power to the heater element. The method increases the heater power in a step-by-step manner. The method further detects a phase of an output signal from the HDI sensor corresponding to the increased heater power, and detects the touchdown based on a change in the detected phase.

18 Claims, 9 Drawing Sheets

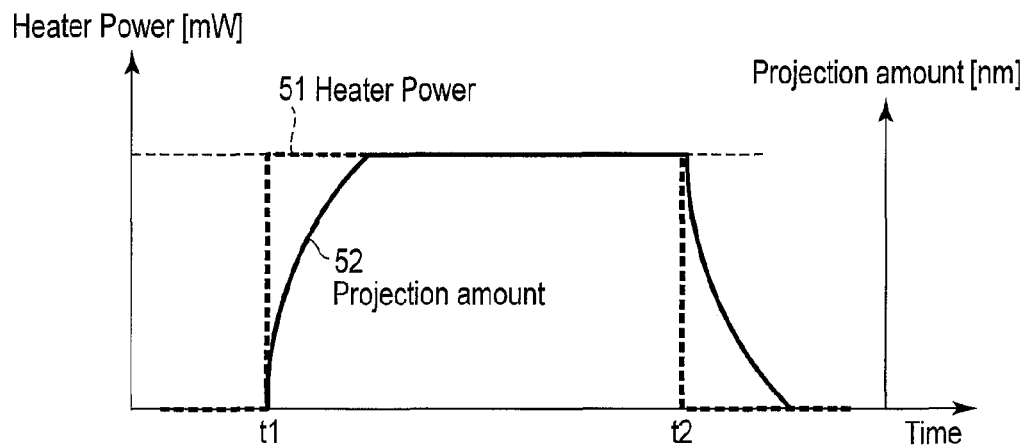
F I G. 5
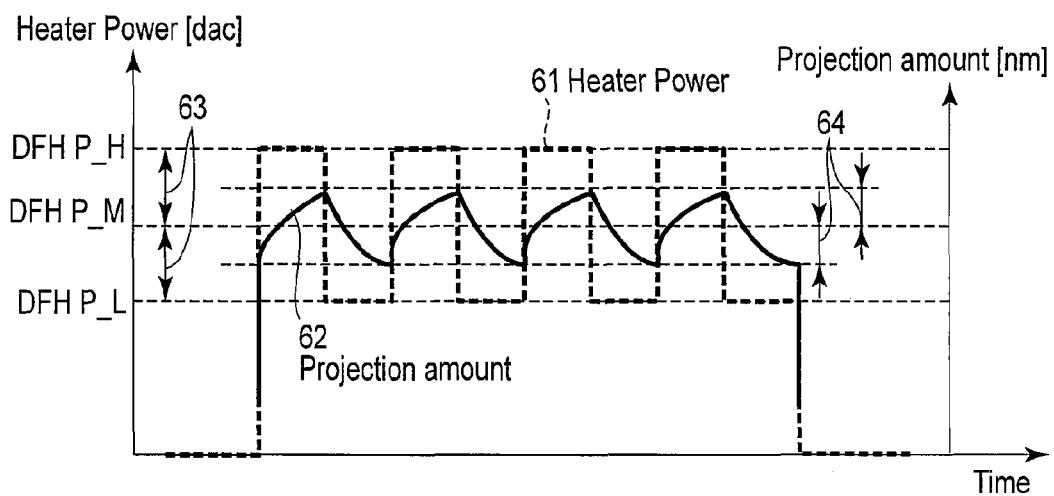
F I G. 6

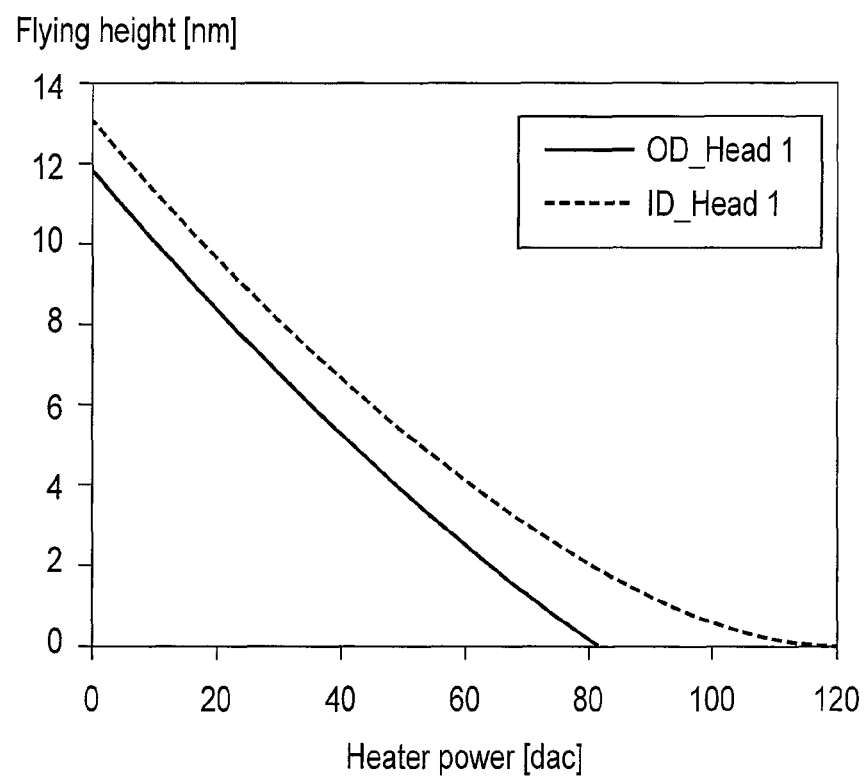
F I G. 7

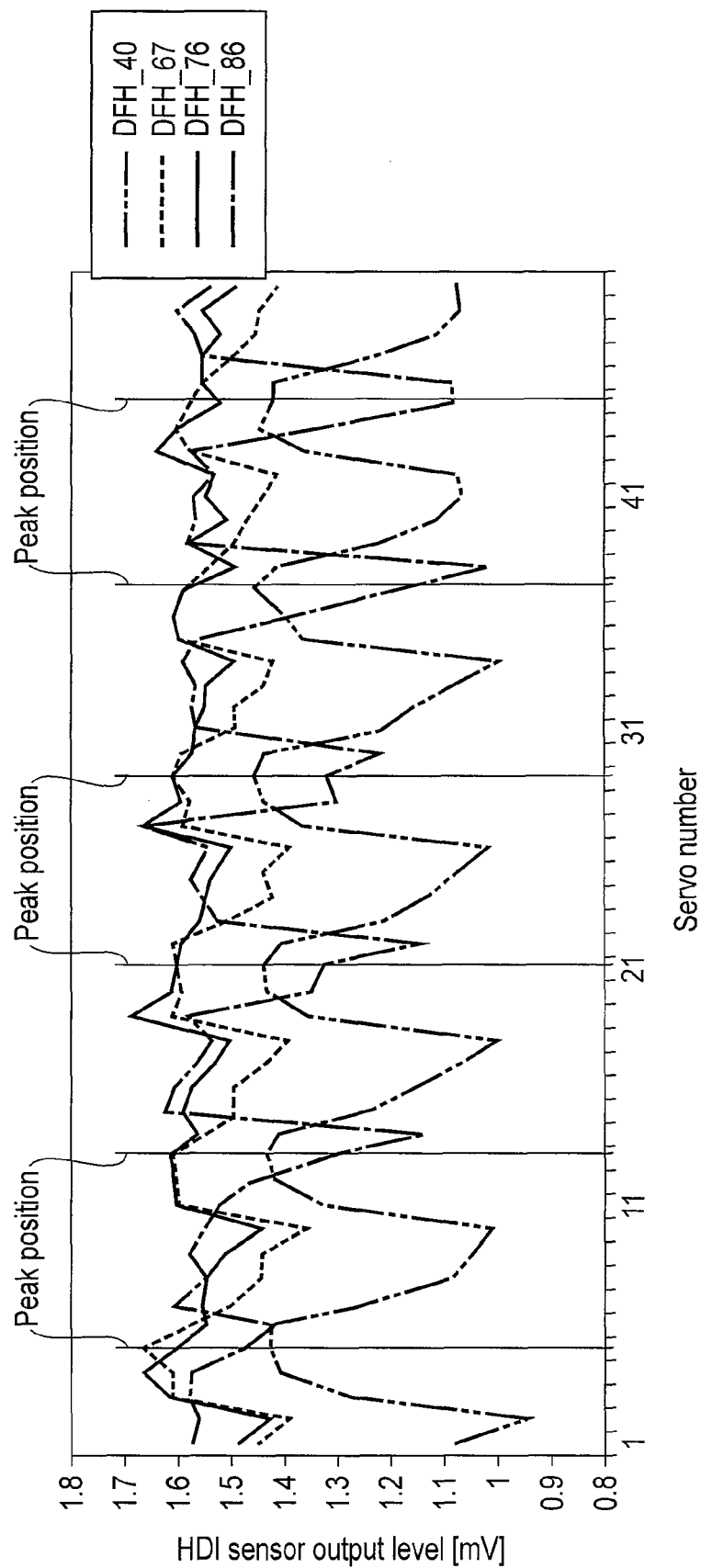
F I G. 8

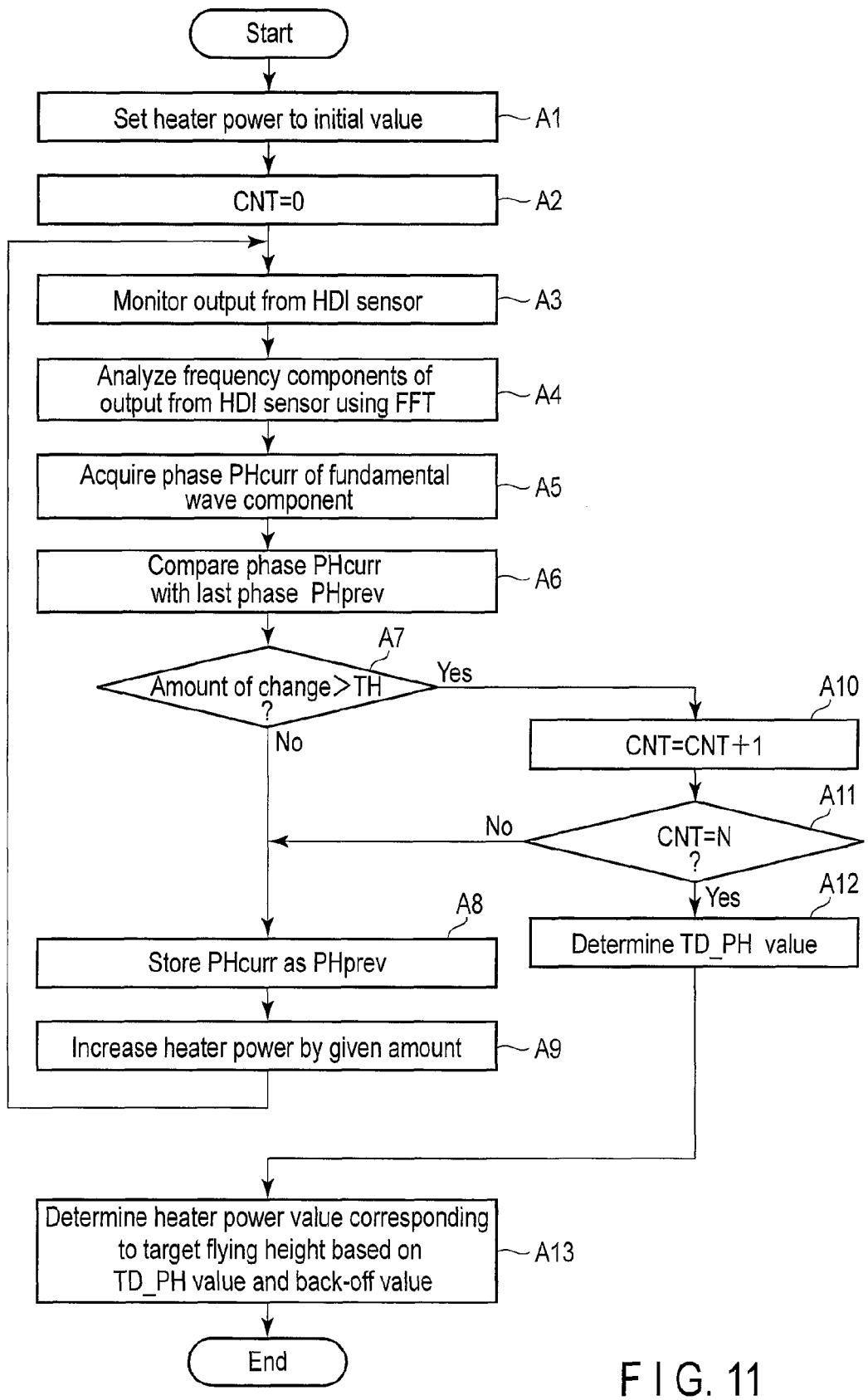
F I G. 11

| HDI sensor sensitivity | Head | Radial position | TD_DCpeak | TD_PH |
|---|---|---|---|---|
| High | Head#1 | OD | 74 | 72 |
| | | OMD | 75 | 72 |
| | | MD | 80 | 76 |
| | | IMD | 79 | 76 |
| | | ID | 77 | 74 |
| | | Detection failure rate (%) | 0 | 0 |
| Low | Head#2 | OD | (Detection failure) | 67 |
| | | OMD | (Detection failure) | 66 |
| | | MD | (Detection failure) | 69 |
| | | IMD | (Detection failure) | 69 |
| | | ID | (Detection failure) | 68 |
| | Head#3 | OD | (Detection failure) | 69 |
| | | OMD | (Detection failure) | 67 |
| | | MD | 71 | 70 |
| | | IMD | 70 | 70 |
| | | ID | 67 | 68 |
| | | Detection failure rate (%) | 70 | 0 |

F I G. 12

METHOD FOR DETECTING TOUCHDOWN OF HEAD AND DISK STORAGE APPARATUS

CROSS-REFERENCE TO RELATED APPLICATIONS

This application claims the benefit of U.S. Provisional Application No. 61/932,089, filed Jan. 27, 2014, the entire contents of which are incorporated herein by reference.

FIELD

Embodiments described herein relate generally to a method for detecting touchdown of a head and a disk storage apparatus.

BACKGROUND

In recent years, disk storage apparatuses have had significantly increased recording densities. Hard disk drives (HDDs) are known to represent the disk storage apparatuses. To allow high density recording to be achieved in an HDD, a magnetic head needs to be located as close to a surface of a magnetic disk (magnetic disk medium) as possible to such a degree that the magnetic head does not contact with the magnetic disk. A distance (spacing) between the magnetic head (hereinafter referred to as the head) and the magnetic disk (hereinafter referred to as the disk) is referred to as a head flying height.

For adjustment of the head flying height, a heater element is provided in the head. When supplied with power (heater power), the heater element generates heat and thus thermally deforms (expands) the head. The thermal deformation causes the head to be projected toward the surface of the disk and thus reduces the head flying height.

A phenomenon known as touchdown (more specifically, touchdown of the head) is utilized to determine the value of heater power needed to set the head flying height to a target value (hereinafter referred to as the operational heater power value). The touchdown refers to a phenomenon in which the head comes into contact with the disk. Here, it is assumed that the heater power increases step by step. In this case, the projection amount of the head gradually increases and eventually causes touchdown. A head disk interference sensor has been used to detect the touchdown.

The operational heater power value is determined based on a value of heater power provided when the touchdown is detected (hereinafter referred to as touchdown heater power). Thus, the touchdown needs to be sensitively and accurately detected in order to allow the head flying height to be accurately set to the target value.

BRIEF DESCRIPTION OF THE DRAWINGS

FIG. 5 is a conceptual drawing showing an example of relationship between heater power and projection amount of a head according to the embodiment;

FIG. 6 is a diagram illustrating the example of relationship between the heater power and the projection amount of the head according to the embodiment in detail;

FIG. 7 is a graph showing an example of flying height characteristic of a head with respect to the heater power for each of different radial positions on the disk at which the head is positioned;

FIG. 8 is a diagram showing profiles of the DC output level of a head disk interference sensor for each level of pulsed heater power;

FIG. 11 is a flowchart showing an exemplary procedure for a heater power determination process according to the embodiment; and FIG. 12 is a diagram showing the effects of the use of a touchdown detection method according to the embodiment in comparison with the effects of the use of another touchdown detection method.

DETAILED DESCRIPTION

Various embodiments will be described hereinafter with reference to the accompanying drawings.

In general, according to one embodiment, a method for detecting touchdown of a head in a disk storage apparatus is provided. The disk storage apparatus comprises the head. The head is configured to fly over a disk. The head comprises a write element, a read element, a head disk interference (HDI) sensor, and a heater element. The HDI sensor is configured to detect thermal interference between the head and the disk. The heater element is configured to thermally deform the head in accordance with heater power supplied to the heater element and to project the head toward a surface of the disk. The method supplies alternating-current heater power to the heater element. The method increases the heater power in a step-by-step manner. The method further detects a phase of an output signal from the HDI sensor corresponding to the increased heater power and detects the touchdown based on a change in the detected phase.

Figure 1:
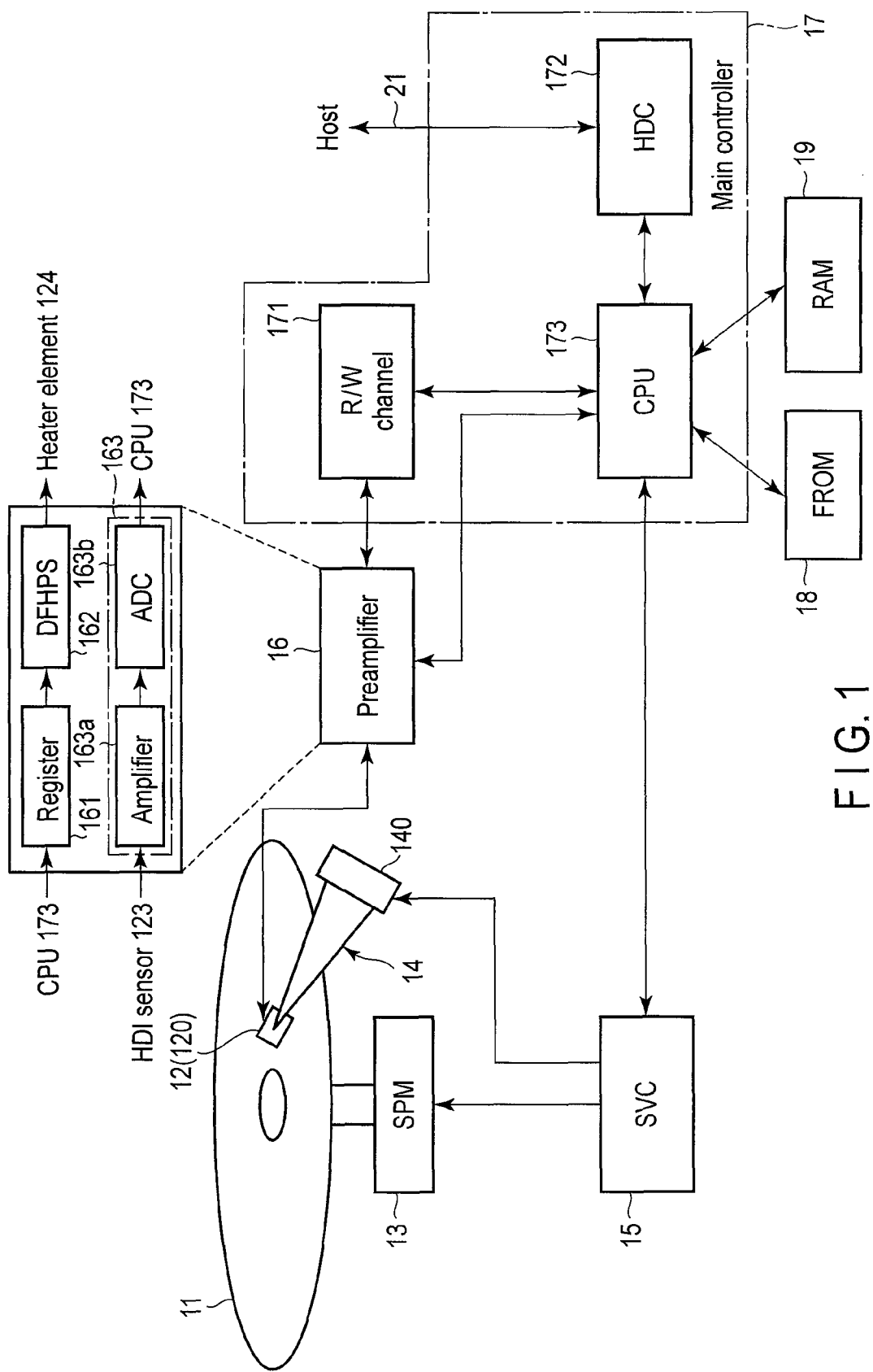
FIG. 1 is a block diagram showing an exemplary configuration of a hard disk drive according to an embodiment.

FIG. 1 is a block diagram showing an exemplary configuration of a hard disk drive (HDD) according to an embodiment. The HDD is known as a typical disk storage apparatus and also referred to as a magnetic disk drive. The HDD (more specifically, an HDC 172 in the HDD) is connected to a host apparatus (hereinafter referred to as a host) via a host interface (storage interface) 21. The host utilizes the HDD as a storage device for the host. The host and the HDD are provided in an electronic device such as a personal computer, a video camera, a music player, a mobile terminal, a mobile phone, or a printer devices.

Figure 3:
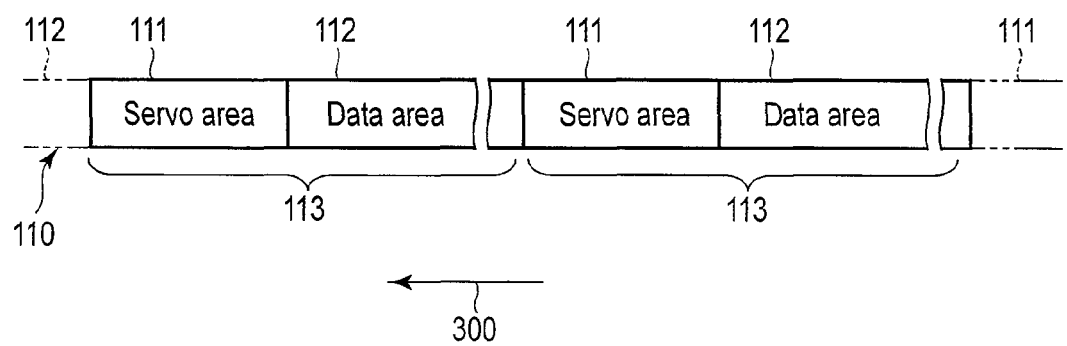
FIG. 3 is a diagram showing an exemplary track format applied in the embodiment.

The HDD includes a disk (magnetic disk) 11, a slider (head slider) 12, a spindle motor (SPM) 13, an actuator 14, a servo controller (SVC) 15, a preamplifier 16, a main controller 17, a flash read-only memory (FROM) 18, and a random access memory (RAM) 19. The disk 11 comprises, for example, on one surface thereof, a recording surface on which data is magnetically recorded. The disk 11 (more specifically, the recording surface of the disk 11) comprises a plurality of concentric tracks 110 (FIG. 3). The disk 11 may comprise a plurality spirally arranged tracks. The disk 11 is rotated at high speed by the SPM 13. The SPM 13 is driven by a driving current (or a driving voltage) supplied by the SVC 15.

Figure 2:
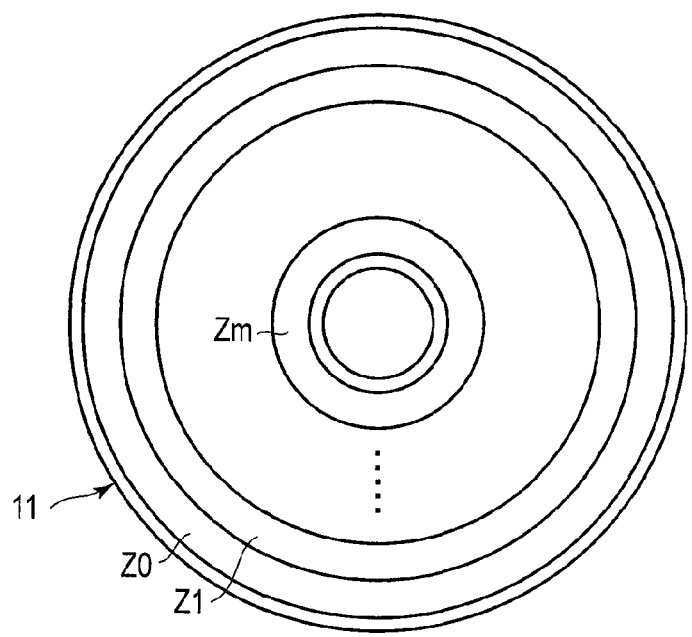
FIG. 2 is a diagram showing an exemplary disk format applied in the embodiment.

The recording surface of the disk 11 is divided into a plurality of concentric areas commonly referred to as zones for management. In other words, the recording surface of the disk 11 comprises a plurality of zones. FIG. 2 shows an exemplary format of the disk 11 applied in the embodiment (in other words, a disk format). In FIG. 2, the recording surface of the disk 11 comprises m+1 zones Z0, Z1, ..., Zm. Zones Z0, Z1, ..., Zm have zone numbers 0, 1, ..., m.

FIG. 3 shows an exemplary format of each of the tracks 110 on the disk 11 which format is applied in the embodiment (in other words, a track format). In FIG. 3, arrow 300 represents the direction of rotation of the disk 11. As shown in FIG. 3, the track 110 comprises a plurality of servo areas 111 (for example, 400 servo areas 111) discretely arranged at regular intervals.

Servo data is recorded in the servo area 111. The servo data includes a servo mark, address data, and servo burst data. The servo mark comprises a particular code (pattern signal) used to identify the corresponding servo area 111. The address data comprises the address of the corresponding track 110 (a cylinder address, in other words, a cylinder number) and a servo number indicative of the corresponding servo area 111 (servo frame 113). The servo burst data comprises data (what is called relative position data) used to detect positional misalignment (positional error) of the head element section 120 with, for example, the center line of the corresponding track 110.

The area between the adjacent servo areas 111 in the track 110 is used s a data area 112. The data area 112 comprises a plurality of data sectors. A set of the servo area 111 and the data area 112 succeeding the servo area 111 provides a servo frame 113.

The slider 12 shown in FIG. 1 is disposed in association with the recording surface of the disk 11. The slider 12 is attached to the tip of a suspension extending from an arm of the actuator 14. The slider 12 flies over the disk 11 in conjunction with rotation of the disk 11. The actuator 14 comprises a voice coil motor (VCM) 140 serving as a driving source for the actuator 14. The VCM 140 is driven using a driving current supplied by the SVC 15. When the actuator 14 is driven by the VCM 140, this causes the slider 12 to move over the disk 11 in the radial direction of the disk 11 so as to draw an arc.

In the configuration in FIG. 1, the HDD is assumed to comprise a single disk 11. However, the HDD may comprise a plurality of disks arranged therein. Furthermore, in the configuration in FIG. 1, the disk 11 comprises the recording surface on one of the surfaces thereof. However, the disk 11 may comprise the recording surface on both surfaces thereof, with sliders arranged in association with the respective recording surfaces.

Figure 4A:
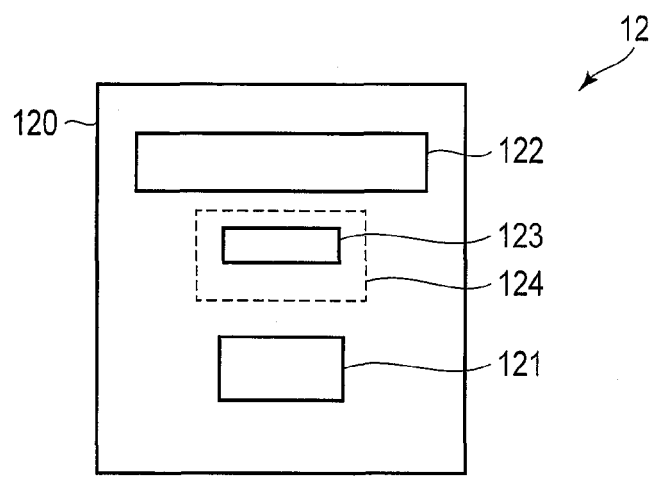
FIG. 4A is a diagram showing an exemplary general structure of a slider observed on a recording surface side of a disk according to the embodiment.
Figure 4B:
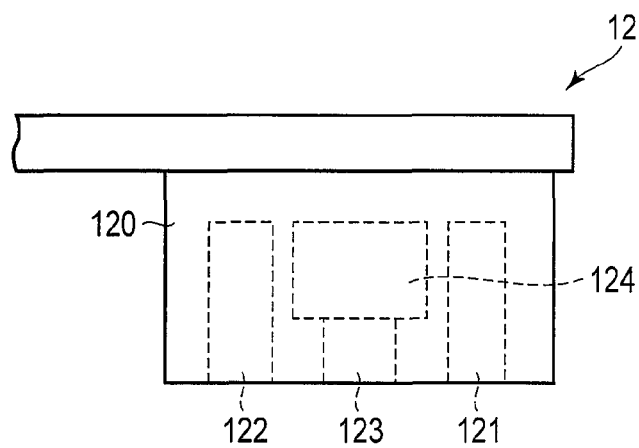
FIG. 4B is a diagram showing an exemplary general structure of the slider observed on a peripheral portion side of the disk according to the embodiment.

FIG. 4A and FIG. 4B show an exemplary general structure of the slider 12 shown in FIG. 1. FIG. 4A is a diagram showing an exemplary general structure of the slider 12 observed on the recording surface side of the disk 11. FIG. 4B is a diagram showing an exemplary general structure of the slider 12 observed on a peripheral portion side of the disk 11. The slider 12 comprises a head element section 120 at one end thereof. The head element section 120 includes a write element 121, a read element 122, a head disk interference sensor 123, and a heater element 124. The head element section 120 is hereinafter simply referred to as the head 120. In other words, the slider 12 comprises the head 120. The slider 12 as a whole is sometimes referred to as the head.

The write element 121 generates a magnetic field in accordance with a write current supplied by the preamplifier 16 and thus changes the magnetic pole of a corresponding area on the disk 11. Thus, data corresponding to a write current is written to (recorded on) the disk 11. That is, the write element 121 is used to write data to the disk 11.

The read element 122 detects a magnetic field generated by the magnetic pole of a corresponding area on the disk 11 and converts the detected magnetic field into an electrical signal. Thus, the read element 122 reads data recorded on the disk 11. In other words, the read element 122 is used to read data from the disk 11.

The head disk interference sensor 123 is also referred to as a head disk interface sensor. The head disk interference sensor (hereinafter referred to as the HDI sensor) 123 comprises, for example, magnetoresistive (MR) element. The MR element is known to have a resistance value changing significantly depending on temperature. The HDI sensor 123 electrically detects interference (in other words, interaction) between the HDI sensor 123 (the head 120 including the HDI sensor 123) and the disk 11. More specifically, in a direct-current mode, the HDI sensor 123 detects a direct-current (DC) component of thermal interference between the head 120 and the disk 11 using the MR element. Furthermore, in an alternating-current mode, the HDI sensor 123 detects an alternating-current (AC) component of the thermal interference using the MR element. According to the embodiment, the HDI sensor 123 is used in the direct-current mode. In other words, the embodiment uses a DC output signal from the HDI sensor.

The heater element 124 is, for example, resistive heating element, and generates heat when supplied with power (heater power) by the preamplifier 16. The heat generated by the heater element 124 causes the head 120 including the heater element 124 to be thermally deformed and projected toward the surface of the disk 11. Changing the projection amount (more specifically, the value of heater power determining the projection amount) allows the spacing (flying height) between the head 120 and the disk 11 (more specifically, the surface of the disk 11) to be adjusted.

A configuration of the HDD will be described with reference again to FIG. 1. The SVC 15 drives the SEM 13 and the VCM 140 under the control of the main controller 17 (more specifically, a CPU 173 in the main controller 17). When the VCM 140 is driven by the SVC 15, the head 120 is positioned at a target track on the disk 11.

The preamplifier 16 is, for example, fixed to a predetermined position of the actuator 14 and electrically connected to the main controller 17 via a flexible printed circuit board (FPC). However, in FIG. 1, the preamplifier 16 is disposed away from the actuator 14 for convenience of drawing. The preamplifier 16 amplifies a signal read by the read element 122 (FIG. 4A and FIG. 4B) of the head 120. The preamplifier 16 also converts write data output by the main controller 17 (more specifically, an R/W channel 171 in the main controller 17) into a write current and outputs the write current to the write element 121 in the head 120.

Furthermore, the preamplifier 16 supplies heater power to the heater element 124 (FIG. 4A and FIG. 4B) in the head 120 in accordance with an instruction from the main controller 17. Thus, the preamplifier 16 comprises a register 161 and a heater power supply (hereinafter referred to as a DFHPS) 162. A part of the register 161 is used to hold a control command and a heater power specification value provided by the main controller 17 (more specifically, the CPU 173 in the main controller 17). The DFHPS 162 supplies heater power specified by the heater power specification value to the heater element 124 in a mode specified in the control command. The register 161 and the DFHPS 162 may be provided independently of the preamplifier 16.

According to the present embodiment, when a normal mode (second mode) is specified in the control command, the DFHPS 162 supplies direct-current heater power of a level indicated by the heater power specification value to the heater element 124. Furthermore, when a touchdown (TD) detection mode (first mode) is specified in the control command, the DFHPS 162 supplies alternating-current heater power to the heater element 124. According to the embodiment, for the heater power, a first period and a second period are alternately repeated: during the first period, the heater power is maintained at the maximum power level (hereinafter referred to as a peak level), and during the second period, the heater power is maintained at the minimum power level (hereinafter referred to as a bottom level). The first period and the second period may be equal to or different from each other. However, the sum of the first period and the second period must always be constant. The embodiment assumes that the first period and the second period are equal to each other. When the first and second periods are each denoted by T/2, the alternating-current heater power used in the embodiment is pulsed heater power with a period T. In other words, the waveform of the heater power used in the TD detection mode is pulsed waveform (square wave) with a period T.

The preamplifier 16 further detects the output level of the HDI sensor 123 (FIG. 4A and FIG. 4B) in the head 120. Thus, the preamplifier 16 comprises a detector 163. The detector 163 includes an amplifier 163a and an analog-to-digital converter (ADC) 163b. The amplifier 163a amplifies an output signal (for example, a DC output signal) from the HDI sensor 123. The ADC 163a converts an output signal from the HDI sensor 123 amplified by the amplifier 163a into digital data, for example, at every timing corresponding to the servo frame 113 shown in FIG. 3. In other words, the ADC 163b samples the output signal from the HDI sensor 123 at the servo timing.

The main controller 17 is implemented, for example, using a large scale integrated circuit (LSI) with a plurality of elements integrated on a single chip. The main controller 17 includes the read/write (R/W) channel 171, the hard disk controller (HDC) 172, and the CPU 173.

The R/W channel 171 processes signals related to reading and writing. That is, the R/W channel 171 converts a read signal amplified by the preamplifier 16 into digital data and decodes the digital data into read data. The R/W channel 171 codes write data transferred by the HDC 172 via the CPU 173 and transfers the coded write data to the preamplifier 16.

The HDC 172 is connected to the host via the host interface 21. The HDC 172 functions as a host interface controller which receives signals transferred by the host and which transfers signals to the host. Specifically, the HDC 172 receives a command (a write command, a read command, or the like) transferred by the host and passes the received command to the CPU 173. The HDC 172 also controls data transfers between the host and the HDC 172. The HDC 172 further functions as a disk interface controller that controls writing of data to the disk 11 and reading of data from the disk 11 via the CPU 173, the R/W channel 171, the preamplifier 16, and the head 120.

In accordance with an access request (a write request or a read request) from the host, the CPU 173 controls the SVC 15 and controls access to the disk 11 via the R/W channel 171, the preamplifier 16, and the head 120. This control is performed in accordance with a control program.

The CPU 173 also controls the DFHPS 162 in the preamplifier 16 in the TD detection mode and thus causes TD by gradually increasing the projection amount of the head 120. The CPU 173 detects the TD using the HDI sensor 123. The CPU 173 further determines the value of direct-current heater power needed to set the flying height of the head 120 to the target value in the normal mode (in other words, operational heater power) based on the value of heater power provided when the TD is detected (in other words, TD heater power).

The FROM 18 is a rewritable nonvolatile memory. The control program is stored in the FROM 18. An initial program loader (IPL) may be stored in the FROM 18, with the control program stored in the disk 11. In this case, when the HDD is powered on, the CPU 173 may execute the IPL and thus loads the control program from the disk 11 into, for example, the RAM 19. The RAM 19 is a volatile memory such as a dynamic RAM. A storage area in the RAM 19 is partly used as a work area for the CPU 173.

Now, the relationship between the heater power and the projection amount of the head 120 will be described below in brief with reference to FIG. 5. FIG. 5 is a conceptual drawing showing an example of the relationship between heater power 51 and the projection amount 52 of the head 52 observed when the level of the heater power 51 is changed at time t1.

In the example illustrated in FIG. 5, the heater power 51 is changed from a bottom level (first level) to a peak level (second level) at time t1. At this time, the head 120 is thermally deformed in accordance with a first time constant. In other words, the projection amount 52 increases in accordance with the first time constant. Thus, the projection amount 52 reaches a stable value when a first duration elapses from time t1. In FIG. 5, in this stable state, the heater power 51 (in milliwatts) is made equal to the projection amount 52 (in nanometers) for easier comparison. The heater power 51 is maintained at the peak level during a period from time t1 to time t2 and changed to the bottom level at time t2. Then, the projection amount 52 decreases in accordance with a second time constant.

Now, the relationship between the heater power and the projection amount of the head 120 will be described in detail with reference to FIG. 6. FIG. 6 is a diagram illustrating an example of the relationship between the pulsed heater power 61 and the projection amount 62 of the head 120 observed when the heater power 61 is supplied to the heater element 124 at a constant period. In FIG. 6, instead of [mW], [dac] is used as the unit of heater power. [dac] (dac value) is the unit of, for example, 8-bit heater power specification value indicative of heater power expressed in decimal number, and is proportional to the unit [mW]. The heater power specification value is set in a predetermined area (for example, an 8-bit area) in a register 161 in the preamplifier 16 by the CPU 173. In the example, the dac value is set in the range of 0 to 255.

In the example illustrated in FIG. 6, for the heater power 61, a peak level period and a bottom level period are alternately repeated; during the peak level period, a peak level (second level) DFHP_H [dac] is maintained, and during the bottom level period, a bottom level (first level) DFHP_L [dac] is maintained. In this embodiment, the bottom level period is equal to the peak level period. In other words, when a middle level (median) between the peak level DFHP_H [dac] and the bottom level DFHP_L [dac] is represented by DFHP_M [dac], the heater power 61 changes at a constant period and an amplitude of a predetermined amplitude setting value 63 with reference to the middle level DFHP_M [dac], as shown in FIG. 6. The amplitude setting value 63 is equal to DFHP_H−DFHP_M and DFHP_M−DFHP_L (DFHP_H−DFHP_M=DFHP_M−DFHP_L).

According to the embodiment, the heater power specification value set in the register 161 by the CPU 173 is indicative of DFHP_L [dac]. In this case, the DFHPS 162 supplies the heater element 124 with the heater power 61, which changes at the constant period and an amplitude of the amplitude setting value 63 with reference to the middle level DFHP_M [dac] (in other words, DFHP_L+amplitude setting value 63) as described above. According to the embodiment, heater power control performed by the CPU 173 can be executed in units of the servo frame 113.

In the example illustrated in FIG. 6, the projection amount 62 of the head 120 increases depending on a change in heater power 61 from the bottom level DFHP_L to the peak level DFHP_H in accordance with the first time constant. On the other hand, the projection amount 62 of the head 120 decreases depending on a change in heater power 61 from the peak level DFHP_H to the bottom level DFHP_L in accordance with the second time constant. More specifically, the projection amount 62 changes at the same period as that of the heater power 61 and an amplitude of an effective amplitude value 64 with reference to the projection amount corresponding to the middle level DFHP_M [dac]. Thus, the peak position and bottom position of the projection amount 62 appear alternately at the same period as that at which the heater power 61 repeatedly exhibits the peak level DFHP_H and the bottom level DFHP_L.

In FIG. 6, the projection amount [nm] is normalized so as to be associated with the heater power [dac]. Thus, the effective amplitude value 64 is also indicative of the heater power [dac] corresponding to the actual projection amount [nm]. Hence, the value of heater power into which, for example, the peak of the projection amount 62 (projection amount profile) is converted is determined by calculating the middle level DFHP_M+the effective amplitude value 64.

Now, the relationship between the heater power and the flying height of the head 120 will be described with reference to FIG. 7. FIG. 7 is a graph showing an example of the flying height characteristic of a head #1 with respect to the heater power for each radial position on the disk 11 at which head #1 is positioned. Head #1 represents the head 120 that utilizes a first air bearing surface (ABS). A radial position on the disk 11 at which head #1 is positioned includes an outer circumferential radial position OD and an inner circumferential radial position ID on the disk 11. The outer circumferential radial position OD and the inner circumferential radial position ID are the position of a first track in an outer circumferential zone and the position of a second track in an inner circumferential zone, respectively.

In FIG. 7, OD_Head#1 represents the flying height characteristic of head #1 observed when head #1 is at the outer circumferential radial position OD on the disk 11. Similarly, ID_Head#1 represents the flying height characteristic of head #1 observed when head #1 is at the inner circumferential radial position ID on the disk 11.

As shown in FIG. 7, the head flying height obtained when the heater power is 0 [dac] (in other words, 0 mW) varies depending on the radial position of the head. The results of measurement relate to the single head. However, if a plurality of heads is measured, the head flying height varies as a result of adjustment during head mounting (adjustment such as Z-height adjustment) even at the same radial position. An increase in heater power increases the head flying height as a result of the projection of the head 120. The head flying height eventually becomes zero. Correct determination of the heater power supplied at a head flying height of zero is necessary for correct control of the head flying height. The correct determination of the head flying height allows pre-measured heater power to be supplied in the state where the head flying height is zero, as determined based on the relationship illustrated in FIG. 7. Thus, regardless of the initial flying state of the head, the flying height can be uniquely set.

The flying height of the head 120 significantly affects electromagnetic conversion-related performance of the head 120. Thus, the flying height is desirably kept constant (target flying height). To achieve this, the CPU 173 determines a reference value for heater power. The reference value for heater power is the value of heater power needed to bring the head 12 into contact with the disk 11 (hereinafter referred to as TD heater power). The state in which the head 120 comes into contact with the disk 11 is referred to as a TD state.

The flying position of the head 120 observed when the head 120 is determined to be in the TD state (the position where the spacing is approximately zero) is referred to as a TD point. The value of the heater power provided at the TD point is referred to as a TD heater power value. The difference between the operational heater power value and the TD heater power value is referred to as a back-off power value. The back-off power value represents the value of heater power needed to increase or reduce (in the embodiment, reduce) the projection amount of the head 120 by an amount equal to the difference between the target flying height and the TD point (hereinafter referred to as the back-off amount). The back-off power value is uniquely determined based on the ABS structure of the head 120.

Upon determining (detecting) the TD state, the CPU 173 determines the operational heater power value as follows based on the TD heater power value in the TD state. As is also apparent from FIG. 7, the relationship between the heater power and the flying height of the head 120 is uniquely determined based on the ABS structure of the head 120 and the radial position on the disk 11 at which the head 120 is positioned.

Thus, upon detecting the TD state (TD point), the CPU 173 uniquely determine the back-off power value corresponding to a predetermined back-off amount based on such a graph (conversion graph) as shown in FIG. 7. The CPU 173 determines a heater power value equal to the TD heater power value minus the determined back-off power value to be the operational heater power value used in the normal mode. In the normal mode, the CPU 173 allows the DFHPS 162 in the preamplifier 16 to supply direct-current heater power indicated by the determined operational heater power value to the heater element 124. Thus, the CPU 173 controls the flying height of the head 120. In order to increase the accuracy of flying control, the relationship between the flying height and the heater power may be obtained for each head.

In view of electromagnetic conversion-related performance of the head 120, the flying height of the head 120 is set as small as possible. On the other hand, in view of the reliability of the interaction (interface) between the head 120 and the disk 11 (hereinafter referred to as HDI reliability), the head 120 needs to maintain a certain flying height. Thus, a method for detecting TD is needed which is high in detection sensitivity and accuracy.

The CPU 173 detects the TD point of the head 120 by varying the radial position on the disk 11 at which the head 120 is positioned. The CPU 173 uniquely sets the back-off amount by which the projection of the head 120 is backed off from the TD point detected at each radial position, to a constant value regardless of the radial position. Thus, regardless of the radial position of the head 120, the flying height of the head 120 can be maintained at the target value. In other words, both the electromagnetic conversion performance and the HDI reliability can be achieved.

According to the embodiment, the disk 11 comprises the recording surface (first recording surface) on one of the surfaces of the disk 11, with the head 120 (slider 12) disposed in association with the first recording surface. Here, it is assumed that, unlike in the embodiment, the disk 11 also comprises a recording surface (second recording surface) on the other surface, with a head (slider) disposed in association with the second recording surface. In this case, for this head, the CPU 173 may also detect the TD point at each radial position and set the back-off amount to a constant value regardless of the radial position. Thus, the flying height of the head may be maintained at the target value without the adverse effect of the radial position on the disk 11 and differences among individual available heads. Hence, the detected TD point needs to be a certain constant point that serves to make the spacing between the head and the disk close to zero and to prevent the HDI reliability from being damaged, the point being independent of the radial position and the differences among the individual available heads.

Now, with reference to FIG. 8, the dependence, on the heater power, of profiles of the output level of the HDI sensor 123 (more specifically, the DC output level) will be described which dependence is observed when pulsed heater power is supplied to the heater element 124 at a constant period. FIG. 8 shows profiles of the output level of the HDI sensor 123 (DC output profiles) obtained when the peak level of the pulsed heater power is 40 [dac], 67 [dac], 76 [dac], and 86 [dac].

In FIG. 8, DFH_40 and DFH_67 represent DC output profiles obtained when the bottom level of the pulsed heater power is 40 [dac] and 67 [dac], respectively. Similarly, DFH_76 and DFH_86 represent DC output profiles obtained when the bottom level of the pulsed heater power is 76 [dac] and 86 [dac], respectively. In FIG. 8, a sequence of servo frames (servo numbers) is used as a parameter corresponding to time. In other words, a time axis in FIG. 8 represents the sequence of servo frames on the track 110 over which the head 120 passes.

The peak level, bottom level, and middle level of the pulsed heater power are represented by DFHP_H, DFHP_L, and DFHP_M, respectively. In this case, the heater power alternately repeats the peak level DFHP_H and the bottom level DFHP_L with reference to the middle level DFHP_M (FIG. 6). In other words, the heater power changes at a constant period and an amplitude of a predetermined amplitude setting value with reference to the middle level DFHP_M. According to the embodiment, this period corresponds to eight servo frames 113.

Furthermore, according to the embodiment, the number of servo frames 113 in each track 110 is 400, and the number of rotations of the disk 11 per minute (60 seconds) is 7,200. In this case, the rotation period of the disk 11 is 60/7,200 [s], and the cycle period of the servo frame is (60/7,200)/400 [s]. Additionally, the cycle period of the heater power corresponds to eight servo frames 113, and thus, T=(60/7,200)×(8/400) [s]. Hence, the repetition frequency of the heater power is 1/T [Hz], that is, (7,200/60)×(400/8) [Hz]=6,000 [Hz]=6.0 [kHz]. In this example, the above-described projection amount 62 has 50 peak positions and 50 bottom positions per track 110. The peak position and the bottom position appear alternately at every four servo frames. In other words, the peak position and bottom position of the projection amount 62 each appear at the same cycle period T as that of the heater power.

The embodiment assumes that the CPU 173 increments the heater power by a given amount in a step-by-step manner in order to detect the TD point. When the heater power is low, in other words, when the peak level, bottom level, and middle level of the heater power are low, the temperature of the heater element 124 is not very high, and thus, the projection amount of the head 120 is small. In this state, the head 120 has a relatively large flying height. In other words, a sufficient spacing is present between the head 120 and the disk 11. This state is referred to as a non-TD state.

In the non-TD state, the thermal conductivity between the head 120 and the disk 11 does not change. Thus, in the non-TD state, when the CPU 173 increases the heater power, the temperature of the heater element 124 rises in proportion to the increase in heater power. In response to the rise in temperature, the resistance value of the MR element in the HDI sensor 123 increases and thus the DC output level of the HDI sensor 123 rises. In the non-TD state, the DC output level rises all over the profile, including the peak positions and the bottom positions. The peak position and the bottom position each appear at a period of eight servo frames (period T). DFH_40 represents an example of a DC output profile in the non-TD state.

When the CPU 173 increases the heater power, the projection amount of the head 120 further increases and thus the head 120 approaches the disk 11. This increases the amount of heat migrated from the head 120 to the disk 11 as a result of heat transfer (the amount of radiation). The DC output level of the HDI sensor 123 eventually stops rising even though the CPU 173 increases the heater power. This state is referred to as a partial TD state. In the partial TD state, the head 120 starts to come into contact with the disk 11 at the positions of servo frames corresponding to the peak positions in the DC output profile. In other words, in the partial TD state, the head 120 comes into contact with the disk 11 at parts of the area over the track 11 at which the head 120 is positioned. Then, the output levels at the peak positions (more specifically, the average value of the output levels at the peak positions) are saturated, and the waveform of the DC output profile changes. DFH_67 represents an example of a DC output profile in such a partial TD state. In this state, as described below, the phase of a fundamental wave component contained in the DC output signal from the HDI sensor 123 starts to change.

In the partial TD state, as the CPU 173 further increases the heater power, the head 120 starts to come into contact with a lubricant on the disk 11. Then, radiation from the head 120 toward the disk 11 progresses rapidly. Thus, the DC output level of the HDI sensor 123 starts to lower rapidly. DFH_76 represents an example of a DC output profile in such state.

Moreover, after the DC output level of the HDI sensor 123 starts to lower rapidly, as the CPU 173 further increases the heater power, the 120 starts to come into contact with the disk 11 even at the positions of servo frames corresponding to the bottom positions in the DC output profile. This state is referred to as a full TD state. In other words, in the full TD state, the head 120 contacts the disk 11 approximately all along the track 11 at which the head 120 is positioned.

In the full TD state, the output levels at the bottom positions in the DC output profile (more specifically, the average value of the output levels at the bottom positions) are saturated. Moreover, at the peak position in the DC output profile, migration of the amount of heat from the head 120 toward the disk 11 causes the output level to lower rapidly. DFH_86 represents an example of a DC output profile in such a full TD state.

As described above, it should be noted that the state of TD may be classified into the partial TD state and the full TD state and that the shape of the DC output profile varies among the states including the non-TD state. If the partial TD state can be sensitively and accurately detected, such a TD point can be detected as serves to make the spacing between the head 120 and the disk 11 close to zero and serves to prevent the HDI reliability from being damaged.

Figure 9:
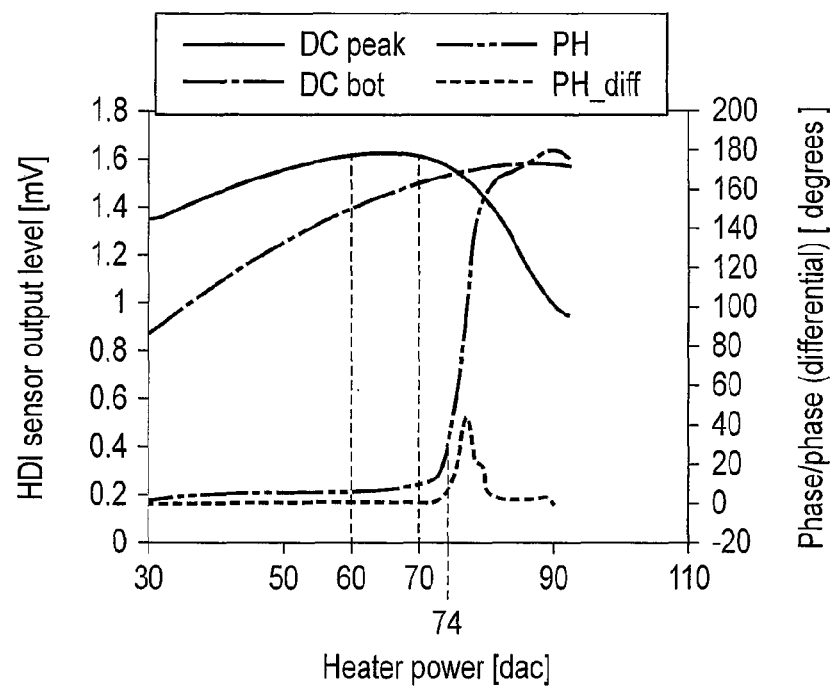
FIG. 9 is a diagram showing an outline of an exemplary method for detecting a touchdown point according to the embodiment.

With reference to FIG. 9, an exemplary method for detecting such a TD point (TD state) according to the embodiment will be described below in brief. FIG. 9 shows an example of the dependence, on the heater power, of each of the following: a peak average value DCpeak, a bottom average value DCbot, a phase PH, and a phase difference PH_diff. The peak average value DCpeak and the bottom average value DCbot represent the average values of the output levels at peak positions and bottom positions in such a DC output profile for each heater power as shown in FIG. 8 (in other words, the profile of the DC output level of the HDI sensor 123). The phase PH and the phase difference PH_diff represent the phase and phase difference (a first-order differential value, in other words, the amount of phase change), respectively, of a fundamental wave component contained in a DC output profile for each heater power described above. The phase of the fundamental wave component is acquired by the CPU 173 by analyzing the frequency components of the DC output profile using fast Fourier transformation (FFT) or discrete Fourier transformation (DFT).

As is apparent from FIG. 9, when the heater power is lower than roughly 60 [dac], the phase PH does not change. Within the range of heater power in which the phase HP does not change, the peak positions and the bottom positions in the DC output profile do not change. Thus, the spacing between the head 120 and the disk 11 within the range of heater power as described above can be considered to be in the non-TD state. At the heater power at which the phase PH starts to change, the peak positions and the bottom positions in the DC output profile start to change and thus the partial TD state starts.

In an example illustrated in FIG. 9, the range of heater power within which the peak average value DCpeak is saturated is approximately 60 [dac] to 70 [dac]. It is assumed that the CPU 173 adopts any of the values of the heater power within the range as a heater power value TD_DC_peak corresponding to the TD point. In other words, it is assumed that the CPU 173 detects the TD point by focusing on the saturation of the peak average value DCpeak. In this case, the state of the contact between the head 120 and the disk 11 varies depending on to the following condition, that is, which of the values within the above-described range is taken by the value TD_DC_peak of heater power provided when the TD point is detected. In other words, the contact state (TD state) at the detected TD point varies depending on the position on the track 110 at which the head 120 is positioned, the position corresponding to, for example, one of the peak positions in the DC output profile.

In the example illustrated in FIG. 9, the phase PH starts to change at a heater power of 74 [dac]. It is assumed that the CPU 173 adopts the heater power of 74 [dac] as a heater power value TD_PH corresponding to the TD point. In the example illustrated in FIG. 9, the phase PH (in other words, the phase of the fundamental wave component) does not change within the range of heater power from 60 [dac] to 70 [dac] in which the peak average value DCpeak is saturated. Thus, according to the embodiment, the partial TD state is determined not to have started even though the peak average value DCpeak is saturated. The partial TD state is determined to start at the heater power at which the phase PH starts to change, in other words, at 74 [dac].

In order to validate the method for determining (detecting) the TD state (more specifically, the partial TD state) based on the actual state of the contact between the head 120 and the disk 11, the inventors measured shake (vibration) of the head 120 while incrementing the heater power in a step-by-step manner. Specifically, the inventors used a transparent cover as a case for the HDD shown in FIG. 1, irradiated the head 120 in the HDD with laser light from the outside of the HDD, measured reflected light from the head 120, and analyzed the amount of noise obtained using frequency analysis. When the head 120 starts to come into contact with the disk 11, a significant increase in the amount of noise is observed at a certain particular frequency. Thus, the inventors determined the amount of noise at the frequency at which a significant increase in the amount of noise was observed. This amount of noise is referred to as the amount of head shake noise.

Figure 10:
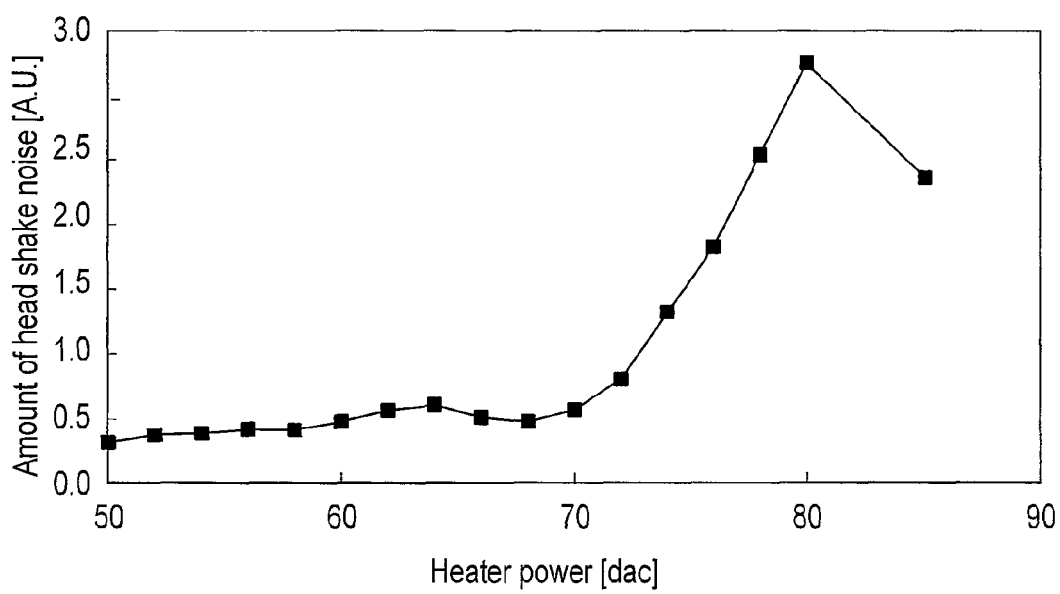
FIG. 10 is a diagram showing an example of amount of head shake noise with respect to the heater power according to the embodiment.

FIG. 10 shows an example of the amount of head shake noise with respect to the heater power. The amount of head shake noise increases when the head 120 starts to shake upon coming to contact with the disk 11. In FIG. 10, the amount of head shake noise starts to increase at a heater power of approximately 74 [dac]. The heater power of 74 [dac] is a value at which the phase PH starts to change as described with reference to FIG. 9. On the other hand, within the range of the heater power from 60 [dac] to 70 [dac] which the peak average value DCpeak is saturated, the amount of head shake noise does not increase. This indicates that the partial TD state is more reliably represented by a TD point corresponding to the heater power value TD_PH than by a TD point corresponding to the heater power value TD_DCpeak. Hence, the flying height of the head 120 can be maintained at the target flying height by detecting the heater power value TD_PH (in other words, the value of the heater power at which the phase PH starts to change) and setting the value of the heater power corresponding to the amount of back-off with reference to the heater power value TD_PH. In other words, the flying height of the head 120 can be maintained at the target flying height by using the heater power value TD_PH as a TD heater power value.

Now, with reference to FIG. 11, a heater power determination process according to the embodiment will be described which process involves detecting the TD point (TD state) based on a change in the phase of the DC output profile and determining the TD heater power value at the TD point and the operational heater power value corresponding to the target flying height. FIG. 11 is a flowchart showing an exemplary procedure for the heater power determination process.

First, the CPU 173 sets the heater power to an initial value (block A1). That is, the CPU 173 sets a heater power specification value indicative of initial heater power and a control command specifying the TD detection mode, in the register 161 of the preamplifier 16. According to the embodiment, the heater power specification value represents the bottom level DFHP_L [dac] of pulsed heater power. In this case, the DFHPS 162 determines the middle level DFHP_M [dac] of the pulsed heater power (in other words, DFHP_L+amplitude setting value) based on the heater power specification value (DFHP_L [dac]) and a predetermined amplitude setting value. Then, the DFHPS 162 supplies the heater element 124 with the pulsed heater power changing at a constant period T and an amplitude of the amplitude setting value with reference to the middle level DFHP_M [dac]. The peak level DFHP_H of the pulsed heater power is equal to DFHP_M [dac]+amplitude setting value. The period T corresponds to eight servo frames 113. The heater power specification value may be indicative of DFHP_H or DFHP_M.

Then, the CPU 173 sets a counter CNT to an initial value of 0 (block A2). The counter CNT is, for example, stored in a predetermined area in RAM 19. Block A1 may be executed after block A2 is executed.

Upon executing blocks A1 and A2, the CPU 173 proceeds to block A3. In block A3, the CPU 173 monitors the DC output level of the HDI sensor 123 via the ADC 163b of the preamplifier 16. In this case, the CPU 173 monitors the DC output level of the HDI sensor 123 during a period corresponding to one round of the track 110 at which the head 120 is positioned (in other words, during a period when the disk makes at least one rotation). However, the CPU 173 may monitor the DC output levels of the HDI sensor 123 during a period corresponding to a plurality of rounds and obtain DC output level corresponding to one round by averaging the monitored DC output levels.

Then, the CPU 173 analyzes the frequency components of the monitored DC output level (in other words, the DC output profile) of the HDI sensor 123 using FFT (block A4). Based on the result of the analysis, the CPU 173 then detects a fundamental wave component of the DC output profile contained in the frequency component of the DC output profile and acquires the phase PHcurr of the fundamental wave component (block A5). The frequency of the fundamental wave component is equal to the repetition frequency of the pulsed heater power and is 6.0 kHz according to the embodiment.

The CPU 173 compares the phase PHcurr with a phase PHprev (block A6). Specifically, the CPU 173 calculates the difference between the phase PHcurr and the phase PHprev as the amount of phase change. The phase PHprev is a phase acquired during the last supply of heater power to the heater element 124. No phase PHprev is present when the initial heater power is supplied to the heater element 124 during the heater power determination process as in this example, in other words, when the phase PHcurr is acquired for the first time. In this case, for example, the CPU 173 determines that PHcurr=PHprev.

Then, the CPU 173 determines whether or not the amount of phase change has exceeds a predetermined threshold (reference value) TH (block A7). The threshold TH may be a constant value but may be calculated based on the deviation of a value obtained when the heater power is lower than the current heater power by a given value [dac]. When the amount of phase change has not exceeded the threshold TH as in this example (No in block A7), the CPU 173 proceeds to block A8. In block A8, the CPU 173 stores the phase PHcurr in a predetermined area in RAM 19 as a phase PHprev. When the phase PHcurr is acquired for the first time during the heater power determination process, the CPU 173 may skip blocks A6 and A7 and proceeds to block A8.

Then, the CPU 173 increases the heater power supplied to the heater element 124 by the given amount (block A9). Specifically, the CPU 173 sets, in the register 161, a new heater power specification value equal to the last heater power specification value plus a value (dac value) Δ corresponding to the given amount. The CPU 173 then returns to block A3. In this manner, the CPU 173 repeats blocks A3 to A9 until the amount of phase change exceeds the threshold TH.

It is assumed that the amount of phase change eventually exceeds the threshold TH (Yes in block A7). That is, it is assumed that the difference between the phase PHcurr and the phase PHprev has exceeded the threshold TH. In this case, the CPU 173 increments the counter CNT by one (block A10). Here, it is assumed that the counter CNT has increased from an initial value of 0 to 1. Then, the CPU 173 determines whether the incremented value in the counter CNT is equal to a reference value N (block A11). According to the embodiment, N is 2. In this case, the value in the counter CNT (CNT=1) is not equal to the reference value N=2.

When the value in the counter CNT (CNT=1) is thus not equal to the reference value N (No in block A11), the CPU 173 determines that the amount of phase change has failed to exceed the threshold TH for N consecutive times (a first number of times). The CPU 173 then executes blocks A8 and A9 as in the case where the amount of phase change does has not exceeded the threshold TH (No in block A7). That is, the CPU 173 stores the phase PHcurr in the predetermined area in RAM 19 as a phase PHprev and increases the heater power by the given amount. The CPU 173 then returns to block A3. The reference value N may be a value other than 2, for example, 1 or 3.

It is assumed that, after the heater power is increased by the given amount (Δ) because the determination in block A11 is No (block A9), the amount of phase change exceeds the threshold TH again (Yes in block A7). In this case, the CPU 173 increments the counter CNT by one again (block A10). The CPU 173 then determines whether the incremented value in the counter CNT is equal to the reference value N=2 (block A11).

In this example, the value in the counter CNT is 2 and is equal to the reference value N=2 (Yes in block A11). In this case, upon recognizing that the amount of phase change has exceeded the threshold TH for two consecutive times, the CPU 173 determines the occurrence of TD (more specifically, partial TD) during the last supply (more specifically, the case of a counter CNT value of 1) of heater power. The value of the last supply of heater power (the case of a counter CNT value of 1) is smaller than the value of the current supply of heater power by the given amount. Thus, the value of the last supply of heater power can be calculated based on the value of the current supply of heater power. However, when the reference value N is 1, the CPU 173 determines that TD (more specifically, partial TD) has occurred at the current supply of heater power. Furthermore, if the counter CNT does not consecutively exceed the threshold TH, that is, if the amount of phase change fails to exceed the threshold TH when the heater power set after the state with a CNT value of 1 is used, the CPU 173 resets the counter CNT to zero. Then, the CPU 173 executes blocks A8 and A9 as in the case where the amount of phase change has failed to exceed the threshold (No in block A7). That is, the CPU 173 stores the phase PHcurr in the predetermined area in RAM 19 as a phase PHprev and increases the heater power by the given amount. The CPU 173 then returns to block A3.

Processing will be described below which is executed when the counter CNT is consecutively incremented and the current value in the counter CNT reaches the reference value. Based on the current value of the heater power (more specifically, the heater power specification value), the CPU 173 determines the TD heater power value TD_PH [dac] corresponding to the TD point as follows (block A12). Here, the current heater power specification value is assumed to be equal to DFHP_Lcurr [dac]. In this case, the CPU 173 calculates the last heater power specification value DFHP_L [dac] by subtracting the given amount from the DFHP_Lcurr [dac]. The CPU 173 then calculates the middle level DFHP_M [dac] by adding a predetermined amplitude setting value to the DFHP_L [dac]. The CPU 173 then adds an effective amplitude value to the DFHP_M [dac] and thus determines the TD heater power value TD_PH [dac].

The effective amplitude value is determined, for example, based on the peak average value DCpeak and the bottom average value DCbot as shown in FIG. 9. In other words, the effective amplitude value is determined by dividing, by 2, the difference in heater power value obtained when the peak average value DCpeak and the bottom average value DCbot are the same in the non-TD state.

Upon determining TD_PH [dac] (block A12), the CPU 173 proceeds to block A13. In block A13, based on TD_PH [dac] and a predetermined amount of back-off, the CPU 173 determines the value of the heater power needed to achieve the target flying height (in other words, the operational heater power value) as follows. First, the CPU 173 determines a back-off power value [dac] corresponding to the predetermined amount of back-off based on such a conversion graph as shown in FIG. 7. The CPU 173 then subtracts the determined back-off power value from TD_PH and thus determines the operational heater power value [dac].

The position where the phase of the fundamental wave component starts to change varies depending on, for example, the ABS structure of the head 120. Thus, the threshold TH may be changed based on the ABS structure of the head 120. For example, if the ABS structure of the head 120 is changed such that the amount of push-back increases when the head 120 starts to come into contact with the disk 11, the phase of the fundamental wave component changes slowly. In such a case, the CPU 173 may set the threshold TH equal to a relatively small phase angle (for example, 10 degrees) to allow the state where the phase starts to change to be detected earlier. Furthermore, the change in phase varies depending on the radial position on the disk 11 at which the head 120 is positioned. Thus, the threshold TH may be set for each zone on the disk 11.

In general, when the head 120 is projected toward the disk 11, the write element 121 in the head 120 comes into contact with the disk 11 earliest. Thus, the sensitivity of the HDI sensor 123 (hereinafter referred to as the HDI sensor sensitivity) depends on the distance between the HDI sensor 123 and the write element 121, and decreases with increasing distance between the HDI sensor 123 and the write element 121. Here, It is assumed that the head 120 is a head #1, a head #2, or a head #3. Furthermore, for head #1, the distance between the HDI sensor 123 and the write element 121 is assumed to be 1.1 μm. For heads #2 and #3, the distance between the HDI sensor 123 and the write element 121 is assumed to be 5.5 μm. In this case, the HDI sensor sensitivity of head #1 is high, and the HDI sensor sensitivity of heads #2 and #3 is lower than the HDI sensor sensitivity of head #1.

FIG. 12 shows the effects of the use of a TD detection method according to the embodiment in comparison with the effects of the use of another TD detection method. Specifically, FIG. 12 shows, in a table form, the results of determination of the heater power values TD_DC_peak and TD_PH corresponding to the TD point for each of five radial positions (zones) on the disk 11 using each of heads #1, #2, and #3.

In FIG. 12, OD indicates that the radial position on the disk 11 at which each of heads #1, #2, and #3 is positioned (hereinafter simply referred to as the radial position) is inside an outer circumferential zone. OMD indicates that the radial position is within an intermediate zone between the outer circumferential zone and a middle circumferential zone. MD indicates that the radial position is within the middle circumferential zone. IMD indicates that the radial position is within an intermediate zone between an inner circumferential zone and the middle circumferential zone. ID indicates that the radial position is within the inner circumferential zone.

As shown in FIG. 12, for head #1, the rate of a failure in the detection of the heater power values TD_DC_peak and TD_PH is 0%. In contrast, for heads #2 and #3, the rate of a failure in the detection of the heater power value TD_PH is 0%, whereas, in detection using saturation of the heater power value TD_DC_peak, the rate of an actual failure in detection is 70% because the sensitivity of the HDI sensor is low, making detection of a saturated value difficult.

Thus, the method for detecting TD (TD point) by focusing on a change in phase according to the embodiment allows TD to be reliably and accurately detected even with a low sensitivity of the HDI sensor compared to a method for detecting TD by focusing on the saturation of the peak average value DCpeak.

The embodiment uses the pulsed heater power as heater power supplied to the heater element 124 in order to detect TD. However, AC heater power with a waveform other than the pulsed waveform, for example, AC heater power with a sinusoidal waveform or a cosine waveform, may be used.

At least one embodiment described above allows TD (touchdown) of the head to be sensitively and accurately detected.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method for detecting touchdown of a head in a disk storage apparatus, the disk storage apparatus comprising the head configured to fly over a disk, the head comprising a write element, a read element, a head disk interference (HDI) sensor, and a heater element, the HDI sensor being configured to detect thermal interference between the head and the disk, the heater element being configured to thermally deform the head in accordance with heater power supplied to the heater element and to project the head toward a surface of the disk, the method comprising:

supplying alternating-current heater power to the heater element;

increasing the heater power in a step-by-step manner;

detecting a phase of an output signal from the HDI sensor corresponding to the increased heater power; and detecting the touchdown based on a change in the detected phase.

2. The method of claim 1, wherein:

detecting the phase comprises calculating a difference between a first phase detected when the increased heater power is supplied to the heater element and a second phase detected when heater power lower than the increased heater power is supplied to the heater element before supplying of the increased heater power; and the touchdown is detected based on the difference.

3. The method of claim 2, further comprising monitoring the output signal from the HDI sensor corresponding to the supply of the heater power during a period when the disk makes at least one rotation, wherein the phase is detected based on the monitored output signal.

4. The method of claim 2, wherein the phase is a phase of a fundamental wave component contained in frequency components of the output signal from the HDI sensor.

5. The method of claim 4, further comprising:

analyzing the frequency components of the output signal from the HDI sensor using fast Fourier transformation; and detecting the fundamental wave component from the analyzed frequency components.

6. The method of claim 2, further comprising determining whether the difference has exceeded a threshold, wherein the touchdown is detected based on whether the difference has exceeded the threshold.

7. The method of claim 2, further comprising:
repeating calculation of the difference in response to an increase in the heater power; and
determining whether the difference has exceeded the threshold,
wherein the touchdown is detected based on whether the difference has exceeded the threshold for a first consecutive number of times.

8. The method of claim 1, wherein the alternating-current heater power has a pulsed waveform.

9. The method of claim 1, further comprising determining a value of direct-current heater power used to maintain a flying height of the head at a target flying height based on a value of heater power provided when the touchdown is detected.

10. A disk storage apparatus comprising:
a disk;
a head configured to fly over the disk, the head comprising a write element, a read element, a head disk interference (HDI) sensor, and a heater element, the HDI sensor being configured to detect thermal interference between the head and the disk, the heater element being configured to thermally deform the head in accordance with heater power supplied to the heater element and to project the head toward a surface of the disk; and
a controller configured to:
control alternating-current heater power supplied to the heater element such that the heater power is increased in a step-by-step manner;
detect a phase of an output signal from the HDI sensor corresponding to the increased heater power; and
detect the touchdown based on a change in the detected phase.

11. The disk storage apparatus of claim 10, wherein the controller is further configured to:
calculate a difference between a first phase detected when the increased heater power is supplied to the heater element and a second phase detected when heater power lower than the increased heater power is supplied to the heater element before supplying of the increased heater power; and
detect the touchdown based on the difference.

12. The disk storage apparatus of claim 11, wherein the controller is further configured to:
monitor the output signal from the HDI sensor corresponding to the supply of the heater power during a period when the disk makes at least one rotation; and
detect the phase based on the monitored output signal.

13. The disk storage apparatus of claim 11, wherein the phase is a phase of a fundamental wave component contained in frequency components of the output signal from the HDI sensor.

14. The disk storage apparatus of claim 13, wherein the controller is further configured to:
analyze the frequency components of the output signal from the HDI sensor using fast Fourier transformation; and
detect the fundamental wave component from the analyzed frequency components.

15. The disk storage apparatus of claim 11, wherein the controller is further configured to:
determine whether the difference has exceeded a threshold; and
detect the touchdown based on whether the difference has exceeded the threshold.

16. The disk storage apparatus of claim 11, wherein the controller is further configured to:
repeat calculation of the difference in response to an increase in the heater power;
determine whether the difference has exceeded the threshold; and
detect the touchdown based on whether the difference has exceeded the threshold for a first consecutive number of times.

17. The disk storage apparatus of claim 10, wherein the alternating-current heater power has a pulsed waveform.

18. The disk storage apparatus of claim 10, wherein the controller is further configured to determine a value of direct-current heater power used to maintain a flying height of the head at a target flying height based on a value of heater power provided when the touchdown is detected.

* * * * *